(12) United States Patent
Kessler

(10) Patent No.: US 8,441,733 B2
(45) Date of Patent: May 14, 2013

(54) PUPIL-EXPANDED VOLUMETRIC DISPLAY

(76) Inventor: David Kessler, Rochester, NY (US)

( * ) Notice: Subject to any disclaimer, the term of this patent is extended or adjusted under 35 U.S.C. 154(b) by 631 days.

(21) Appl. No.: 12/762,314

(22) Filed: Apr. 17, 2010

(65) Prior Publication Data

US 2010/0271698 A1   Oct. 28, 2010

Related U.S. Application Data

(60) Provisional application No. 61/172,701, filed on Apr. 24, 2009.

(51) Int. Cl.
*G02B 27/14* (2006.01)
(52) U.S. Cl.
USPC .......................................... 359/630; 359/631
(58) Field of Classification Search ................... 359/630, 359/631, 636, 639
See application file for complete search history.

(56) References Cited

U.S. PATENT DOCUMENTS 7,391,573 B2  6/2008 Amitai
2006/0126182 A1  6/2006 Levola

FOREIGN PATENT DOCUMENTS

WO   WO2005/121707   12/2005

*Primary Examiner* — William Choi
(74) *Attorney, Agent, or Firm* — Louis S. Horvath

(57) ABSTRACT

A volumetric imaging apparatus has a volumetric image generator with a light source, a light modulator, and a display surface. The volumetric image generator is energizable to form, on the display surface, an image over a range of focal positions at the entrance pupil of an optical system. The optical system is disposed to direct light from the image to a one-dimensional pupil expander. A combiner surface is disposed in the path of output light from the pupil expander for displaying the volumetric image.

20 Claims, 16 Drawing Sheets

PUPIL-EXPANDED VOLUMETRIC DISPLAY

CROSS REFERENCE TO RELATED APPLICATIONS

Priority is claimed from U.S. Ser. No. 61/172,701, provisionally filed on Apr. 24, 2009, entitled "A Pupil-Expanded Volumetric Display" in the name of David Kessler and incorporated herein by reference.

FIELD OF THE INVENTION

This invention generally relates to volumetric imaging and more particularly relates to a volumetric imaging apparatus using a pupil expander in a single dimension.

BACKGROUND OF THE INVENTION

Three-dimensional (3-D) imaging has recognized value in a number of applications as diverse as medical imaging, visualization technologies, and navigational guidance systems. Advantaged over 2-D display methods and devices, 3-D imaging techniques help to improve how well image data can be represented to a viewer and provide useful characteristics that allow a measure of depth perception that can be particularly valuable in such applications.

A number of 3-D imaging methods are available for more closely representing objects as they appear in space. Stereoscopic imaging apparatus, for example, operate by forming separate images for the left and right eyes of a viewer. Typically, some type of device, such as polarized glasses or other device, is needed in order to separate the two images and allow a measure of stereoscopic viewing. Auto-stereoscopic viewing apparatus can form a 3-D image without the need for a separation device, using virtual imaging methods for forming left and right eye pupils for the viewer at appropriate points in space. However, such devices must compensate for viewer movement out of the pupil space in order to successfully provide a suitable stereoscopic image.

While stereoscopic and auto-stereoscopic imaging apparatus provide the appearance of 3-D, however, the imaging methods that are used provide only a limited number of psychological depth cues. True depth perception is based on a complex interaction of the visual system and related brain processes that we use to recognize and locate positions in space. Stereoscopic and auto-stereoscopic systems simulate convergence which is an aspect of depth position, but fail to provide the visual cue for focal accommodation. Parallax, for example, is observable only over a limited viewing zone. The perspective of the stereoscopic pair is correct for only a small distance. Overall, stereoscopic depth cues can tend to conflict with physical cues, leading to visual confusion and fatigue, as well as to misjudgment of distance, velocity, and shape. This conflict is known in the art as the "convergence—accommodation discrepancy". For reasons such as these, stereoscopic techniques can be inappropriate for navigational guidance applications, such as for use in heads-up displays.

Unlike stereoscopic methods, volumetric display methods actually form a true volume image that provides realistic physical depth cues, such as focal accommodation, parallax, convergence, and binocular disparity. A volumetric display operates by forming an image whose light rays, from the position of the viewer, are substantially indistinguishable from light rays that would appear to the viewer for an actual object.

One useful application of volumetric imaging systems is for use in navigational guidance. For example, International Publication No. WO 2005/121707 entitled "En-route Navigation Display Method and Apparatus Using Head-up Display" by Grabowski et al. describes a navigational display system that forms an image of an overhead cable or other element for guiding the driver of a motor vehicle to a destination, much in the manner of following a cable. The volumetric imaging apparatus that is used forms a true volume image as a virtual image using the windshield or other surface that is disposed in front of the driver. In the volumetric imaging optical apparatus, a light source is rapidly scanned along a screen or diffusive element for forming the image of a "virtual cable". During each scan, the diffusive surface vibrates or uses some other method for rapidly changing the focus during a scan.

While the methods and apparatus taught in the '1707 Grabowski et al. application provide the benefits of volumetric imaging for improved navigational guidance, however, implementation of such a system comes at a cost. The optical system needed to support volumetric imaging is hampered by its size requirements and by the complexity of its aspherical optical components. Lenses used are characterized by large diameters, resulting in high cost, placement constraints, and difficulty of mounting.

Thus, it can be seen that there is room for improvement in volumetric imaging for navigational guidance and other applications.

SUMMARY OF THE INVENTION

It is an object of the present invention to advance the art of volumetric image display. With this object in mind, the present invention provides a volumetric imaging apparatus comprising:
  a volumetric image generator comprising a light source, a light modulator, and a display surface, wherein the volumetric image generator is energizable to form, over a range of focal positions, an image on the display surface at the entrance pupil of an optical system;
  the optical system disposed to direct light from the display surface to a one-dimensional pupil expander; and
  a combiner surface that is disposed in the path of output light from the pupil expander for displaying the volumetric image.

It is a feature of the present invention that it provides a compact optical system by implementing pupil expansion in one dimension only, using the same optics for both left- and right-eye images provided to the viewer.

It is an advantage of the present invention that it provides a volumetric image having true parallax and perspective for use in navigational guidance and other applications.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings.

DETAILED DESCRIPTION OF THE INVENTION

Figure 1:
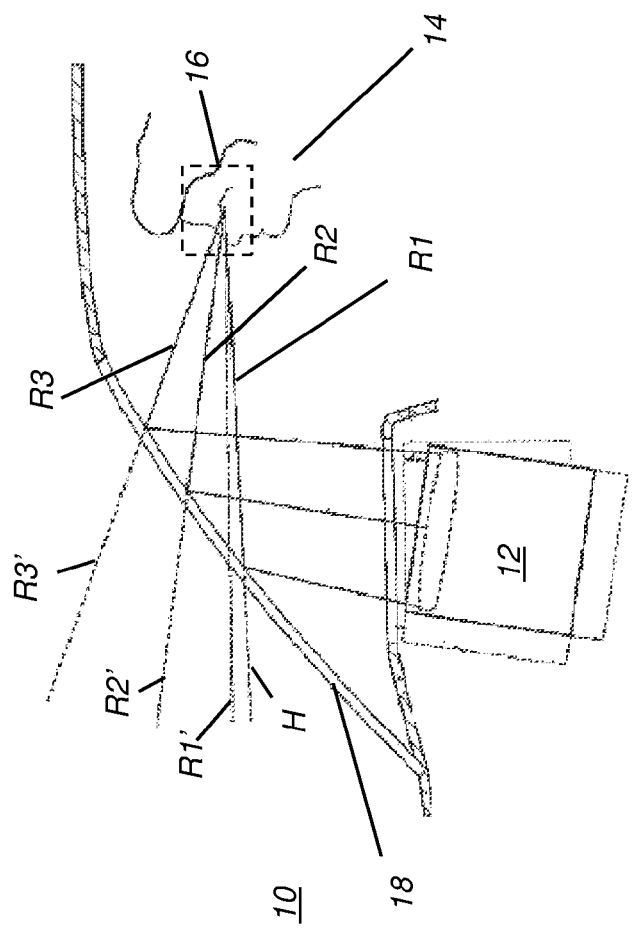
FIG. 1 is a schematic block diagram that shows an existing volumetric imaging apparatus for use in a motor vehicle.

The present description is directed in particular to elements forming part of, or cooperating more directly with, apparatus in accordance with the invention. It is to be understood that elements not specifically shown or described may take various forms well known to those skilled in the art.

Figures shown and described herein are provided in order to illustrate key principles of operation and component relationships along their respective optical paths according to the present invention and are not drawn with intent to show actual size or scale. Some exaggeration may be necessary in order to emphasize basic structural relationships or principles of operation. Some conventional components that would be needed for implementation of the described embodiments, such as various types of optical mounts, for example, are not shown in the drawings in order to simplify description of the invention itself. In the drawings and text that follow, like components are designated with like reference numerals, and similar descriptions concerning components and arrangement or interaction of components already described are omitted. Where they are used, the terms "first", "second", and so on, do not denote any ordinal or priority relation, but are simply used to more clearly distinguish one element from another.

The term "oblique" or "oblique angle" has its conventional meaning, as relating to an angular relationship that is either greater than or less than a right (90 degree) angle and not parallel with respect to its reference, that is, not an integer multiple of 90 degrees.

The term "optical axis" has its conventional meaning for each of the embodiments described subsequently. With rotationally symmetrical optics, the optical axis simply corresponds to the axis of rotational symmetry. However, with asymmetric optics, the optical axis is more generally defined as the path taken by a ray that is centered in the aperture of the light-concentrating optical component. For cylindrical optics, there may be an axis of symmetry with respect to a plane; this may or may not correspond to the optical axis. With a cylindrical optical device, the optical axis is in the plane where there is optical power orthogonal to the direction along which the cylindrical device is extended. For clarity, the term optical axis is used in the following description as relative to a single refractive or reflective optical component, rather than relative to the larger optical system that comprises multiple components. The more general term "optical path" is used herein to describe the path taken by a particular beam of light in the optical system of the present invention.

The term "mirror" is used as a general term to refer to a reflective surface. This may be a mirrored or coated surface or may be an uncoated surface of a component used for its reflective properties, such as a prism.

Figure 2:
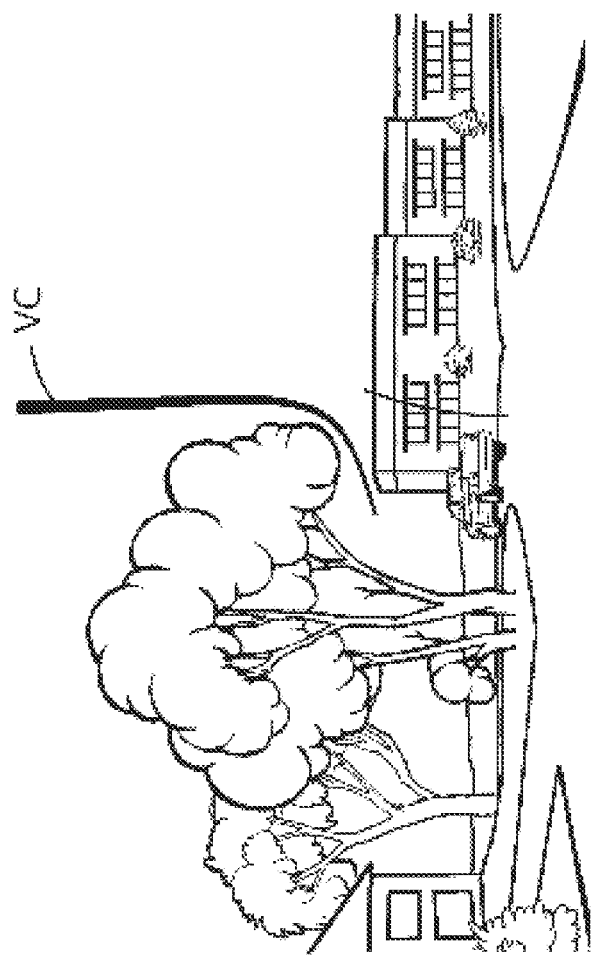
FIG. 2 is a plan view showing the representation of an existing virtual cable for a navigational guidance system using volumetric imaging.

In order to more fully understand aspects of embodiments of the present invention, it is instructive to consider a volumetric display for navigation assistance in one embodiment, as taught, for example, in the Grabowski et al. '1707 application cited earlier. In this application, an optical apparatus provides a heads-up display that presents a volumetric image to a driver of a motor vehicle. Referring to the schematic view of FIG. 1, there is shown a volumetric display 10 with a display device 12 that directs an image to a viewer 14, such as the driver of the motor vehicle. Light rays R1, R2, and R3 shown are reflected from a windshield 18 or other surface to form a virtual image that is volumetric and appears to be beyond the windshield, as represented by virtual rays R1', R2', and R3'. Line H represents a true horizontal with respect to the viewer. The image is formed within a spatial region termed an eye box 16. The viewer can then see the virtual image as a volumetric image when the viewer's eyes are within eye box 16. In one embodiment as shown in FIG. 2, the device described in the Grabowski et al. '1707 application displays a virtual cable VC that changes position as a navigation guide.

Figure 3:
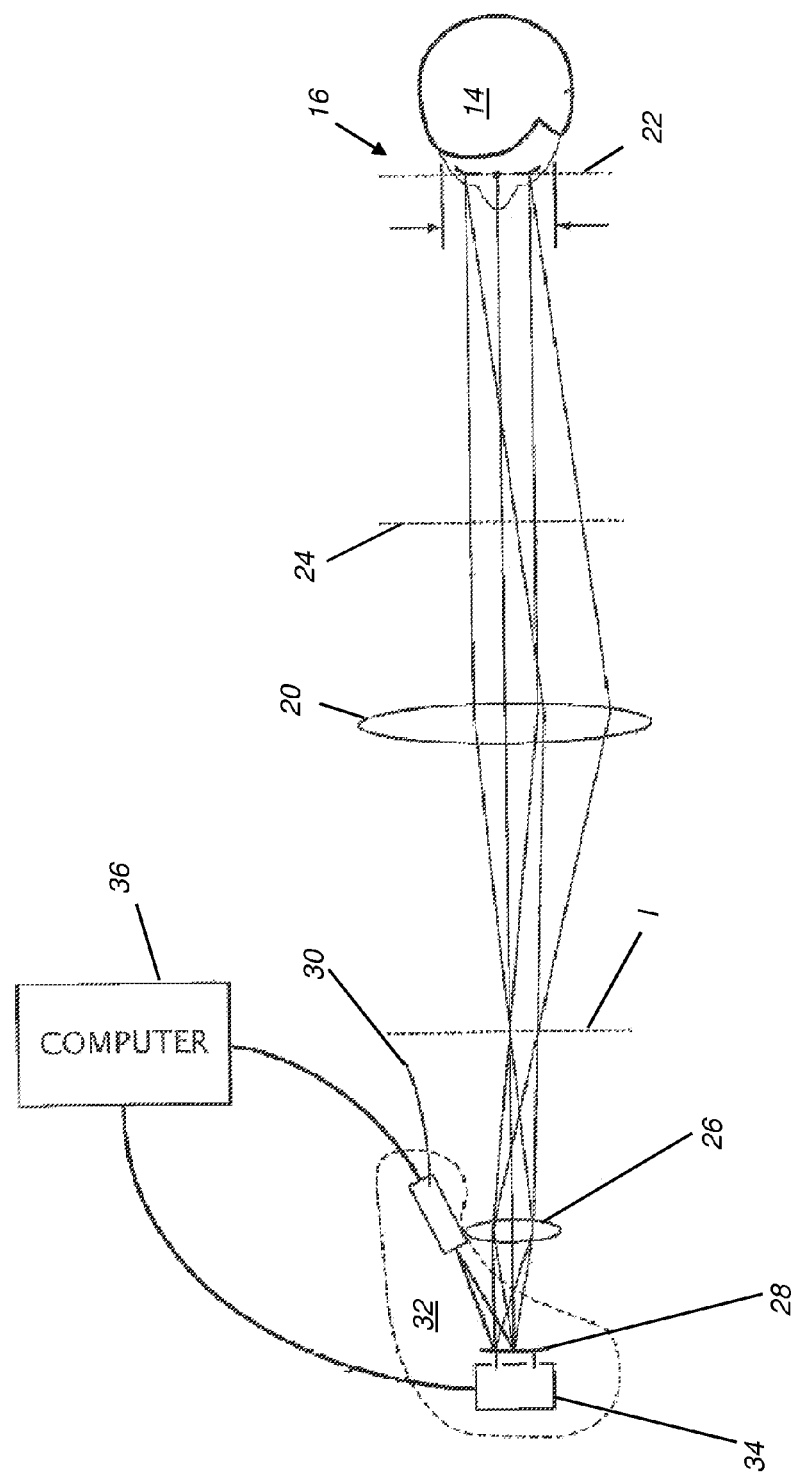
FIG. 3 is a schematic diagram showing the optical path used for volumetric imaging according to the embodiment shown in FIG. 1.
Figure 4:
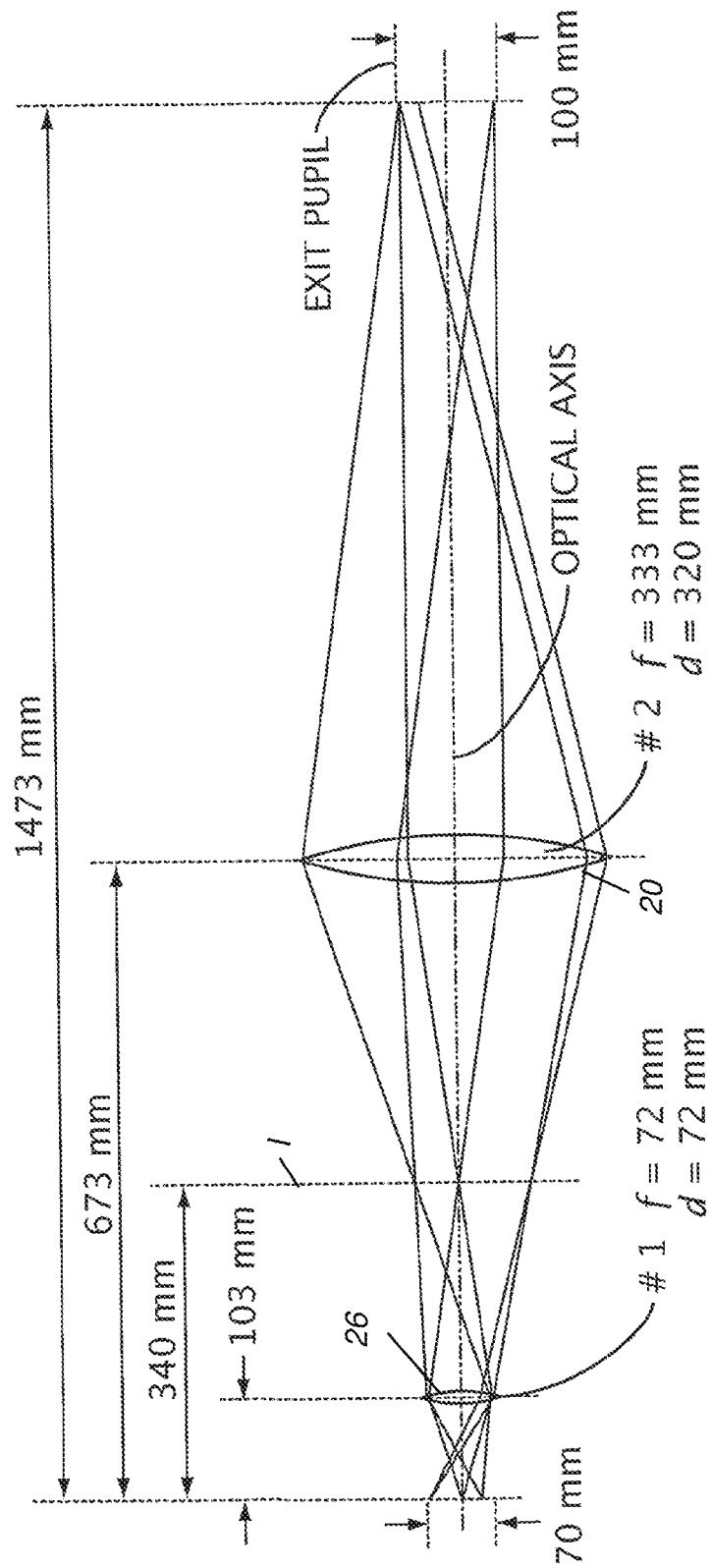
FIG. 4 is a schematic diagram showing the optical path used for an existing volumetric imaging with some exemplary dimensions for a proposed volumetric imaging apparatus.

The schematic diagrams of FIGS. 3 and 4 show elements of the optical system for volumetric display 10. A volumetric image generator 32 generates the source image by directing light from a light source 30 onto a diffusion screen 28. A projection screen actuator 34, such as a voice coil actuator or piezoelectric actuator, is energized to provide rapid, repeated movement of diffusion screen 28 back and forth along the optical axis, in order to provide a rapidly changing focal plane, preferably oscillating at a rate that is fast enough so that it is imperceptible to the human viewer, several times per second. A computer 36 provides the necessary logic for controlling and coordinating the writing and screen oscillation functions for providing the volumetric image. Continuing with the description of FIG. 3, a relay lens 26 forms a real intermediate image 1 at the input focal plane of an eye lens 20. The imaged light is then directed to a combiner 24, typically the windshield of a motor vehicle or other surface, such as a substantially flat transparent surface that is mounted onto a windshield, that combines the volumetric virtual image with the field of view of viewer 14. FIG. 4 shows the unfolded optical path of imaged light in one embodiment of the Grabowski et al. '1707 device.

The size requirements for volumetric system optics using such a system, however, are considerable. In particular, a large exit pupil is needed in order to provide the volumetric image. Because large lenses are used, the optical system can be fairly expensive.

In response to the need for a more cost-effective and compact solution for volumetric imaging, the apparatus and methods of the present invention provide alternate optical designs using a one-dimensional pupil expander. The phrase "one-dimensional pupil expander" relates to expansion of the pupil with respect to one orthogonal axis, the vertical axis, and not the orthogonal horizontal axis. The use of a pupil expander, a type of beam expander, provides advantages in expanding the imaged light provided from the volumetric display along the vertical axis only. This advantage is particularly useful for forming volumetric images that extend in length, such as the vertical cable VC described earlier with reference to FIG. 2. In addition, the use of pupil expansion in the vertical direction also allows folding the optical path for a more compact arrangement.

Pupil expanders have been developed for use with various types of two-dimensional (2-D) displays, such as with Liquid-Crystal Devices (LCDs). Pupil expanders or extenders enable relatively small optical systems, with correspondingly small pupils, to provide a system output with a larger effective pupil for ease of viewing. For example, U.S. Patent Application Publication No. 2006/0126182 entitled "General Diffractive Optics Method for Expanding an Exit Pupil" by Levola teaches using an arrangement of holographic surfaces for 2-D pupil expansion. Another type of pupil expander is described in U.S. Pat. No. 7,391,573 entitled "Substrate-Guided Optical Devices" to Amitai. The Amitai '573 disclosure describes the use of a light guide having parallel outer surfaces and two or more partially reflective inner surfaces for light redirection.

Earlier pupil expanders, such as those described in the Levola '6182 and Amitai '573 disclosures, preserve the field angle as they expand the pupil. There is, however, no way to provide two sets of fields, one for each eye, having different convergence angles. Thus, for stereoscopic imagery, conventional pupil expanders are limited to use only with near-eye displays, with a separate pupil expander for each eye.

With volumetric displays such as that shown in the Grabowski et al. '1707 disclosure, the problem becomes even more complex. Light must be handled differently in the vertical and horizontal directions. Where a large pupil is presented to both eyes, it is not possible to expand the pupil in the horizontal direction and preserve convergence in this direction at the same time. Thus, for volumetric displays of this type, pupil expansion can be permitted only in the vertical direction, where no convergence is provided. At the same time, the system must maintain a suitable pupil size in the horizontal direction to provide properly convergent display information to the viewer.

Figure 5:
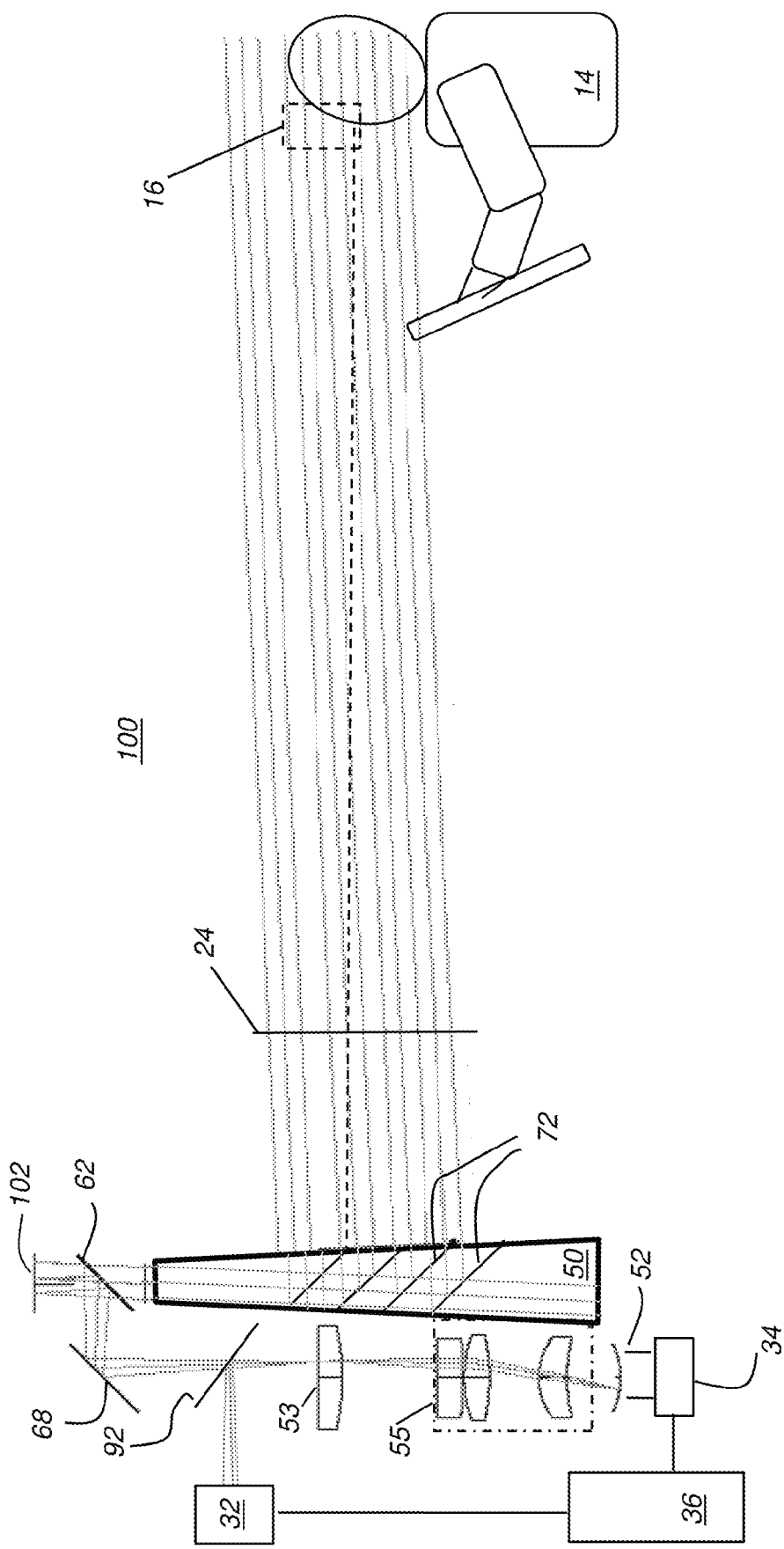
FIG. 5 is a schematic diagram showing the optical path used for volumetric imaging according to an embodiment of the present invention.

The schematic top view of FIG. 5 shows a volumetric imaging apparatus 100 using a pupil expander 50 according to one embodiment. Volumetric image generator 32 is energizable to form an image over a range of focal positions at the entrance pupil of an optical system. In the FIG. 5 embodiment, volumetric image generator 32 is coupled to volumetric imaging apparatus 100 optics via a beam splitter 92. In one embodiment, volumetric image generator 32 is a laser scanner unit that typically contains a scanning device such as a galvo mirror and a scanning lens (not shown). Computer 36 controls focus through projection screen actuator 34, coupled to diffusion screen 52, and controls volumetric image generator 32. The imaged or image-bearing light from diffusion screen 52 is then relayed by an optical relay 55 onto a field lens 53. The imaged light is directed by a mirror 68 and a beam splitter 62 toward a curved mirror 102. Curved mirror 102 then projects the beam of imaged light to the viewer via a pupil expander 50. Pupil expander 50, described in more detail subsequently, is a trapezoidally shaped prism made of glass or plastic that contains a number of partial reflectors 72 which spread the narrow beam as shown. Between the viewer 14 and the pupil expander 50 there is a combiner 24 which, for volumetric imaging within a vehicle, can be either the windshield or a flat transparent combiner surface that is disposed close to the windshield. The use of pupil expander 50 enables expansion of the pupil size in a single direction, here, the vertical direction. As shown in FIG. 5, the use of pupil expander 50 allows the optics to be folded into a more compact form than with earlier volumetric imaging systems. It should be noted that pupil expansion in the vertical direction is particularly advantageous for navigational guide applications that provide an image that extends predominantly in one direction, such as for the virtual cable described in the Grabowski et al. '1707 reference. As noted earlier, pupil expansion in the horizontal direction is less desirable, since visual cues for convergence are predominantly horizontal.

Figure 6:
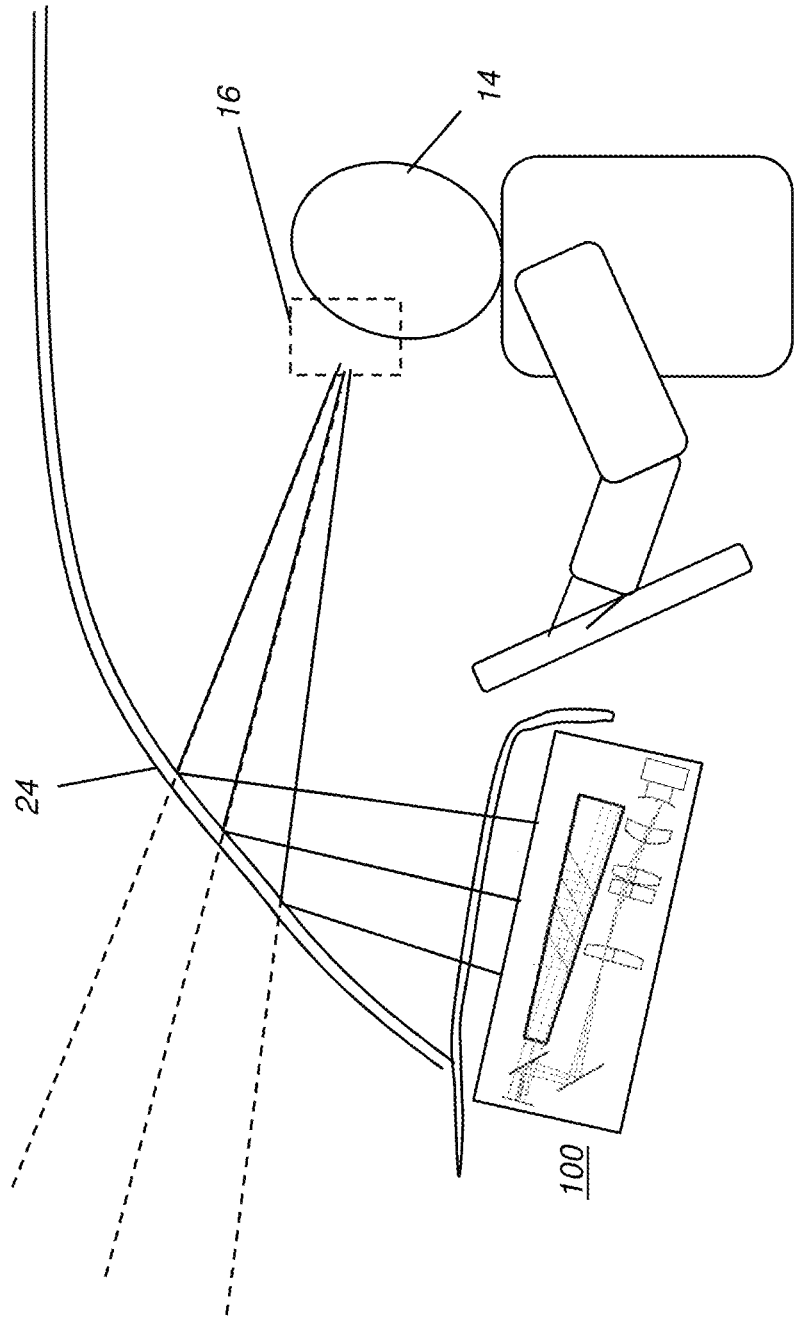
FIG. 6 is a schematic diagram showing the optical path used for volumetric imaging according to an embodiment of the present invention as mounted in a motor vehicle.

The cross-sectional schematic view of FIG. 6 shows how volumetric imaging apparatus 100 using pupil expander 50 is positioned in order to form eye box 16 for viewer 14 in a motor vehicle. For the light rays shown, convergence is achieved when eye box 16 lies in the paths of rays to both left and right eyes.

Figure 7:
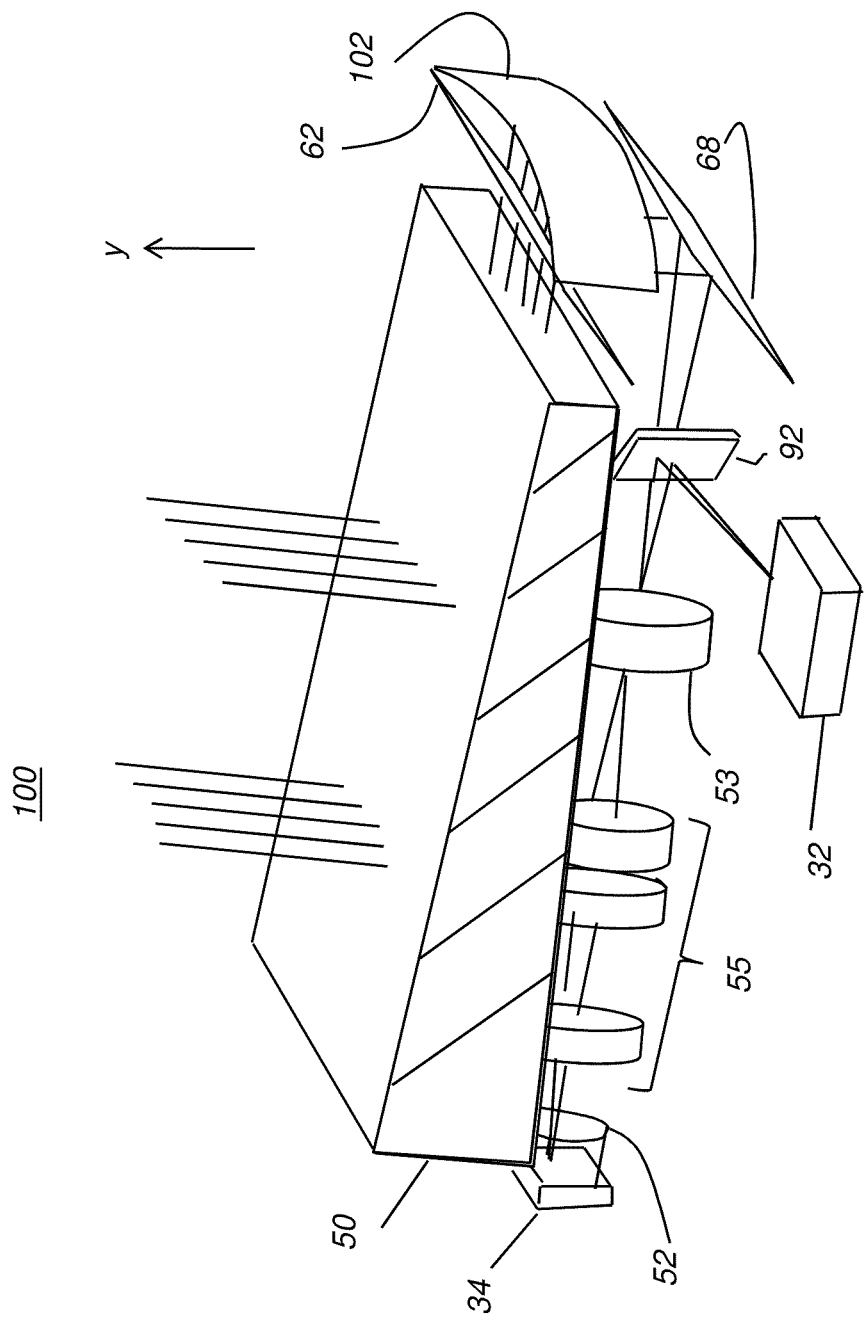
FIG. 7 is a schematic block diagram that shows components of an embodiment of a volumetric imaging apparatus of the present invention.

FIG. 7 is a more detailed view of the components of a preferred embodiment of volumetric imaging apparatus 100 of the present invention. Volumetric image generator 32 forms the image on diffusion screen 52 through beam splitter 92. Lenses in optical relay 55 are aspheric and relatively small. As can be seen in FIG. 7, reducing the size of volumetric imaging apparatus 100 in the vertical direction, shown as the y direction, depends on making the apertures of lenses 55 and 53 as small as possible. Field lens 53 is preferably a cylindrical field lens, which reduces vignetting by the small apertures of the system in the vertical direction.

Modulated, image-bearing light directed through beam splitter 92 is reflected by a mirror 68. Beam splitter 62 redirects this light to a curved mirror 102 that may be spherical or aspheric. The light reflected from curved mirror 102 goes back through beam splitter 62 and to pupil expander 50 for projection onto the windshield or other combiner (as shown in preceding figures).

Figure 8A:
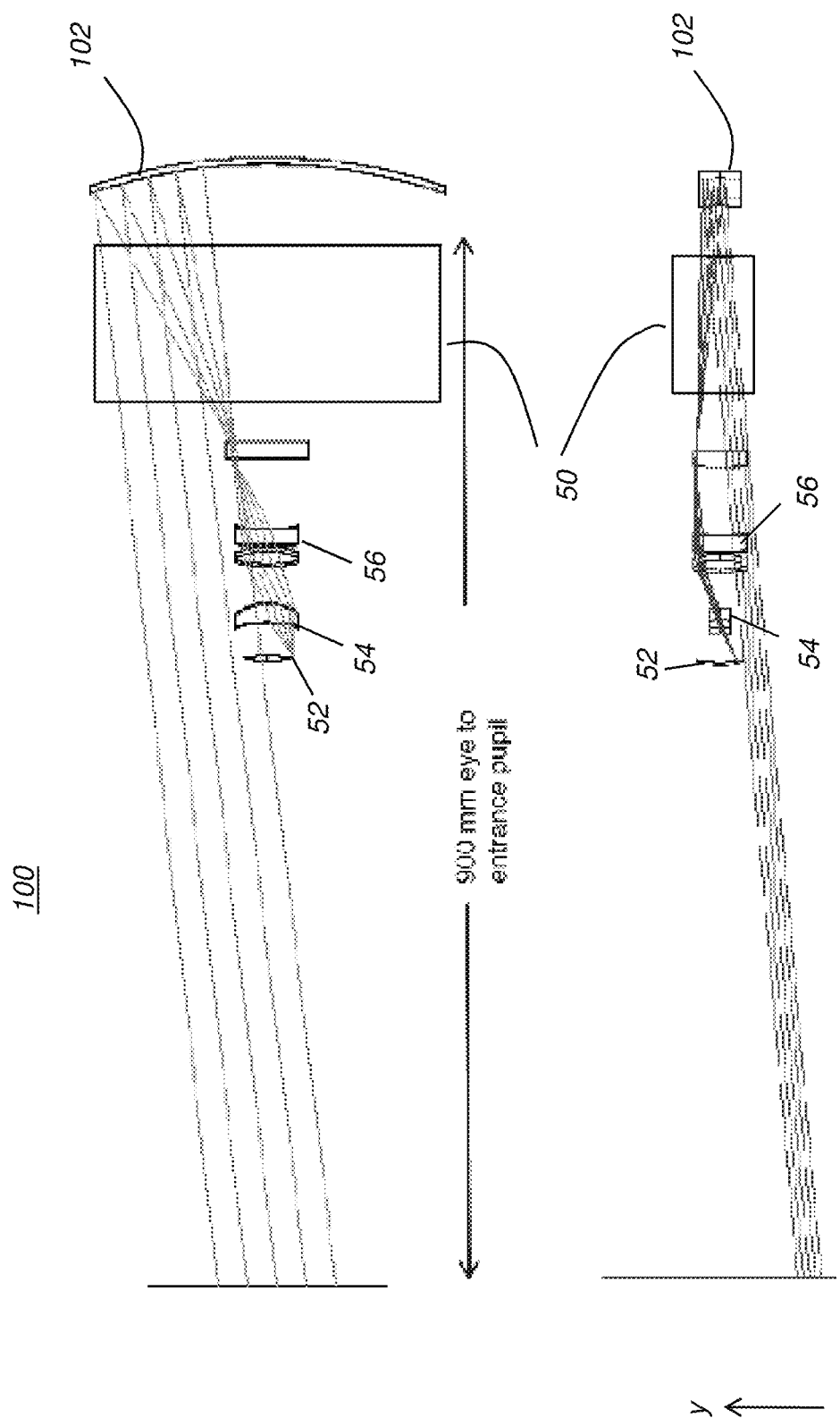
FIG. 8A shows cross sectional views of the volumetric imaging apparatus of the present invention.

The schematic diagram of FIG. 8A shows how the optical arrangement of volumetric imaging apparatus 100 handles light in the horizontal and vertical directions. The semi field is 7 degrees in the horizontal direction and 5 degrees in the vertical direction. The relative position of pupil expander 50 is shown, receiving the light reflected from curved mirror 102. The vertical view (lower portion of FIG. 8A) is schematic and does not show the light bend in pupil expander 50, as is shown in FIG. 5.

Figure 8B:
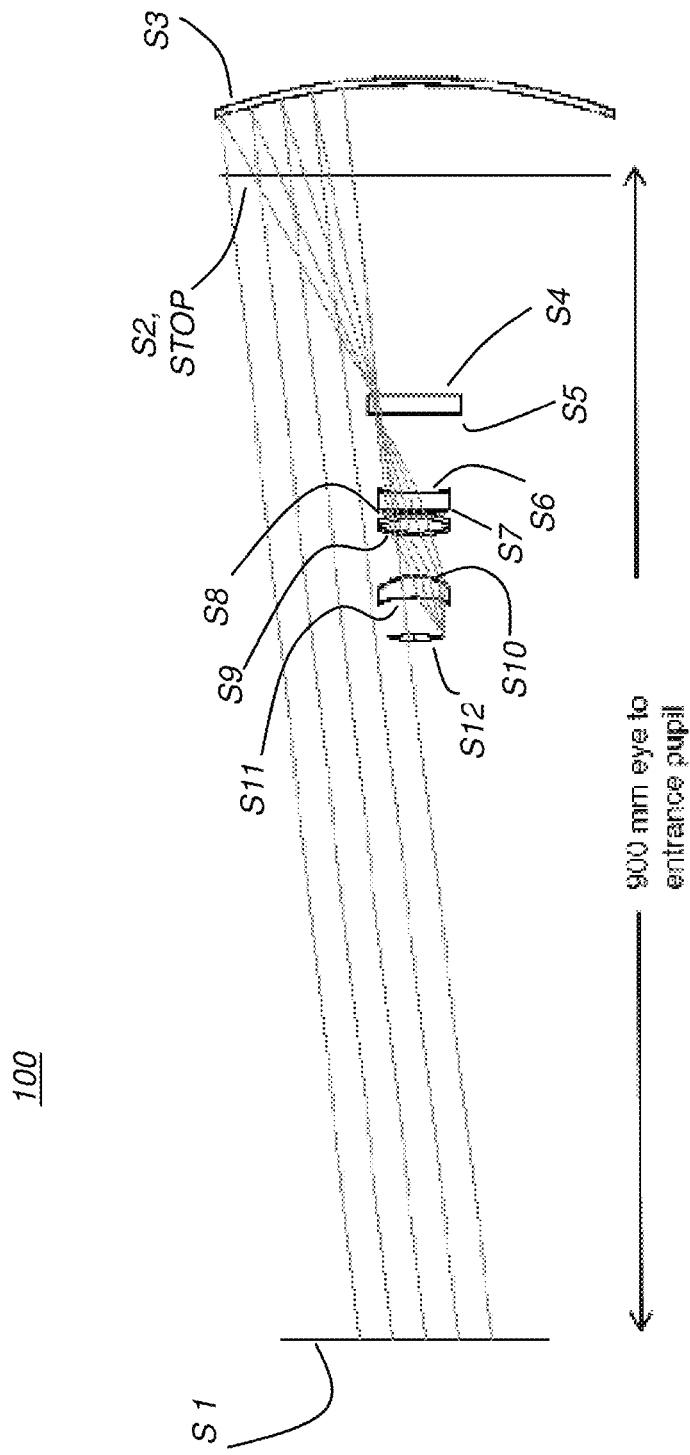
FIG. 8B shows surface designations for volumetric imaging apparatus optics in one embodiment.

Optical design data in one embodiment of the system of FIG. 8A is shown in Table 1, using the surface designations shown in FIG. 8B. The object, surface 0 on Table 1, is nominally at a negative distance of 16 meters, far to the left and not shown in FIGS. 8A and 8B. The image is at the diffuser 52. The effective entrance pupil of this system in the horizontal direction is at eye box 16 (FIGS. 5 and 6). The effective entrance pupil in the vertical direction is at the input to pupil expander 50. The volumetric image generator is not included in Table 1.

TABLE 1

SURFACE DATA SUMMARY (FIG. 8B)

| Surface | Type | Radius | Thickness | Glass |
|---|---|---|---|---|
| 0 | STANDARD | Infinity | −16000 | |
| S1 | STANDARD | Infinity | 900 | |
| STO | STANDARD | Infinity | | |
| S3 | EVENASPH | −487.071 | −239.6524 | MIRROR |
| S4 | TOROIDAL | Infinity | −15 | S-BAH28 |
| S5 | TOROIDAL | 150 | −59.99999 | |
| S6 | EVENASPH | 350.5494 | −16 | S-BAH28 |
| S7 | STANDARD | 284.5747 | −1 | |
| S8 | STANDARD | −80.07262 | −16 | S-BAH28 |
| S9 | STANDARD | 124.7846 | −30.86998 | |
| S10 | STANDARD | −41.40917 | −18 | S-BAH28 |
| S11 | EVENASPH | −175.7299 | −33.47769 | |
| S12, IMA | TOROIDAL | 50.86959 | | |

Figure 9:
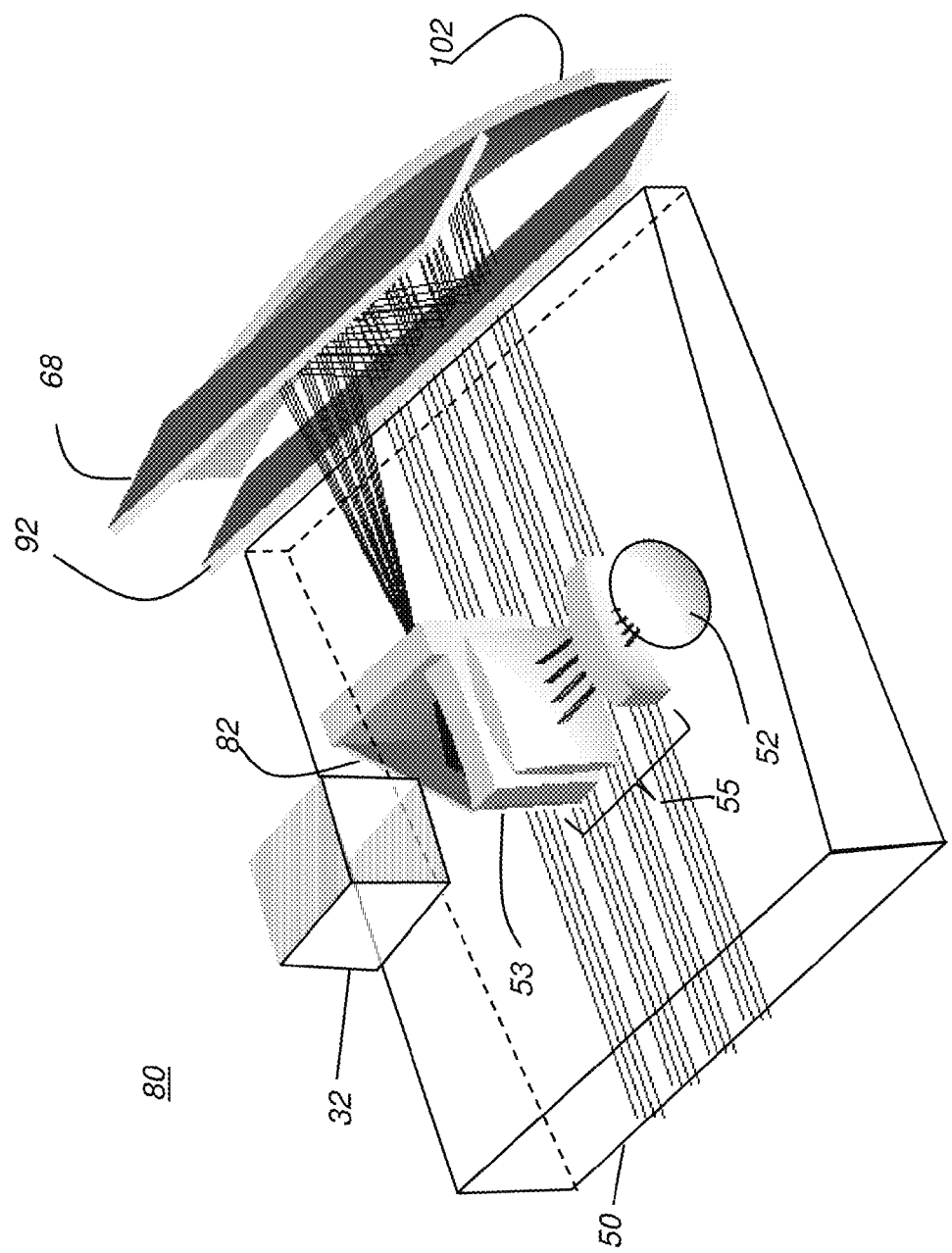
FIG. 9 is a perspective view of the volumetric imaging apparatus in an alternate embodiment.

FIG. 9 shows an alternate embodiment of volumetric imaging apparatus 80 in a perspective view from below, wherein the optical system is folded at an additional beam splitter 82 so that volumetric image generator 32 directs light towards diffusion screen 52 through beam splitter 82. Folding in the horizontal plane using beam splitter 82 provides more compact packaging by using space beneath pupil expander 50.

One consideration of interest when using the folded optical paths such as that shown on FIG. 7 relates to optical efficiency. Each transit of the imaged light through a beam splitter loses up to half the light. While high intensity of the light is not normally a requirement for navigational guidance applications, other applications may benefit from improved efficiency. One way to achieve this is by using polarized light. In one embodiment, beam splitter 62 is a polarization beam splitter, such as a wire grid polarizer from Moxtek, Inc., Orem Utah, for example. A quarter-wave plate (not shown) would then be provided in the optical path between beam splitter 62 and curved mirror 102. By rotating the polarization of the light in this way, an efficiency gain of 100% over use of a conventional beam splitter can be obtained. Even better efficiency could be obtained using a polarized laser as the light source with a polarization beam splitter and using polarization-preserving diffuser as diffusion screen 52. One example of a polarization-preserving diffuser is disclosed in U.S. Pat. No. 6,381,068 entitled "Reflective Projection Screen and Projection System" to Takashi Harada et al.

While a number of types of pupil expanders can be used, it should be noted that previously described pupil expanders, such as that taught in the Amitai '573 disclosure cited earlier, require high-performance coatings. This relates to the requirement stated in the Amitai '573 teaching for parallel major surfaces. With these outer surfaces in parallel, however, total internal reflection (TIR) within the pupil expander substrate causes multiple reflections at different angles within the device, a number of which need to be suppressed. This requirement with conventional pupil expanders significantly complicates the design of internal coatings, reduces performance, and adds considerable cost to pupil expander design.

Figure 10:
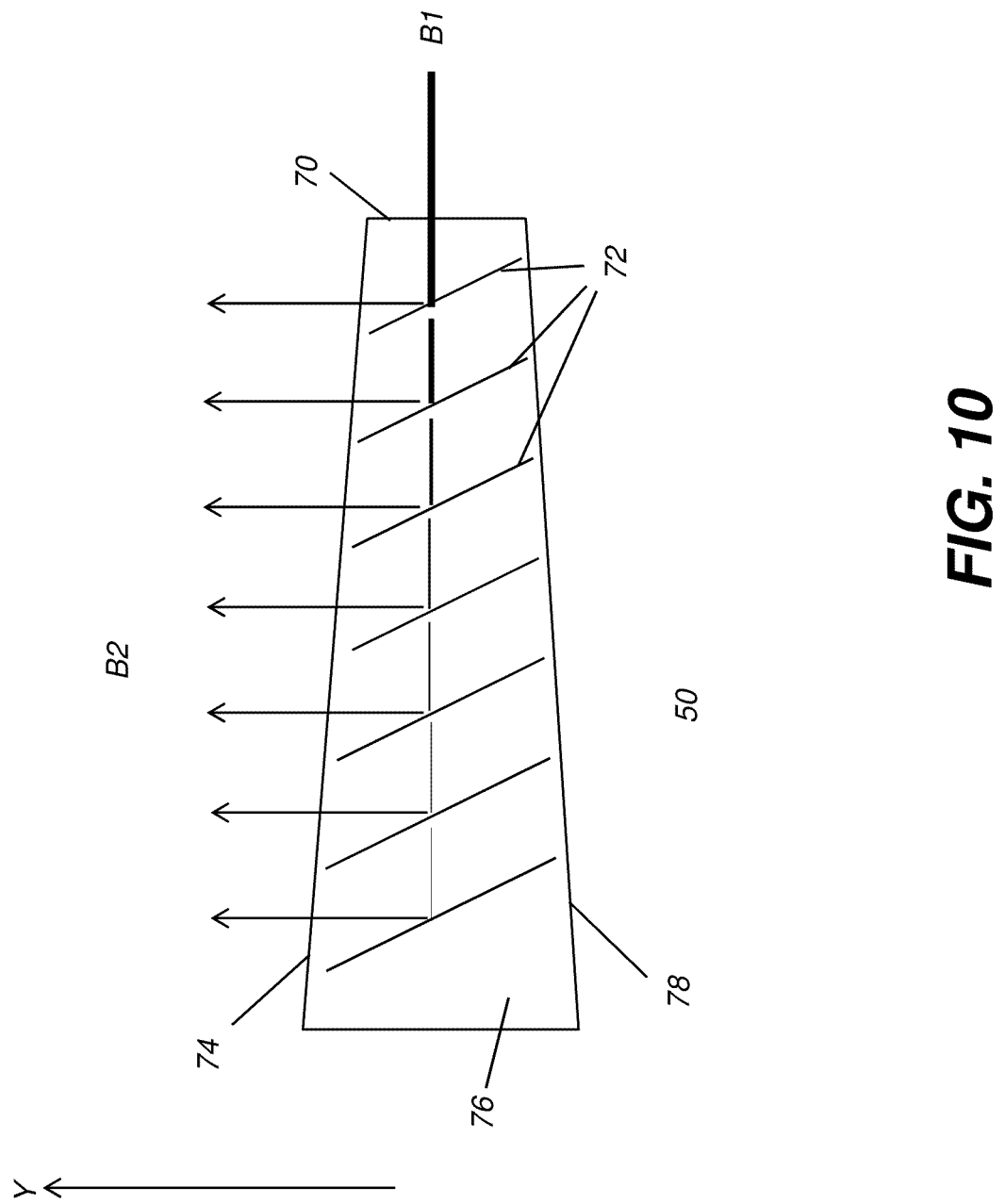
FIG. 10 is a schematic view of the pupil expander according to one embodiment.

In response to the need for a lower cost pupil expander that expands the pupil in a single orthogonal dimension, embodiments of the present invention use a modified pupil expander design. Pupil expander 50 shown in FIG. 10 has major surfaces 74 and 78 that, instead of being in parallel, are obliquely disposed with respect to each other. Pupil expander 50 in this embodiment is also narrower at the entrance side, an entrance surface 70. With this arrangement, an input beam B1 is partially reflected at each of internal partially reflective surfaces 72 to provide an expanded output beam B2. The obliquely angled major surfaces 74 and 78 are at angles in excess of those that would allow TIR within a substrate 76. In alternate embodiments, pupil expander 50 could be the type of pupil expander taught in the Amitai '573 disclosure or could use holographic elements in place of partially reflective surfaces 72.

Figure 11A:
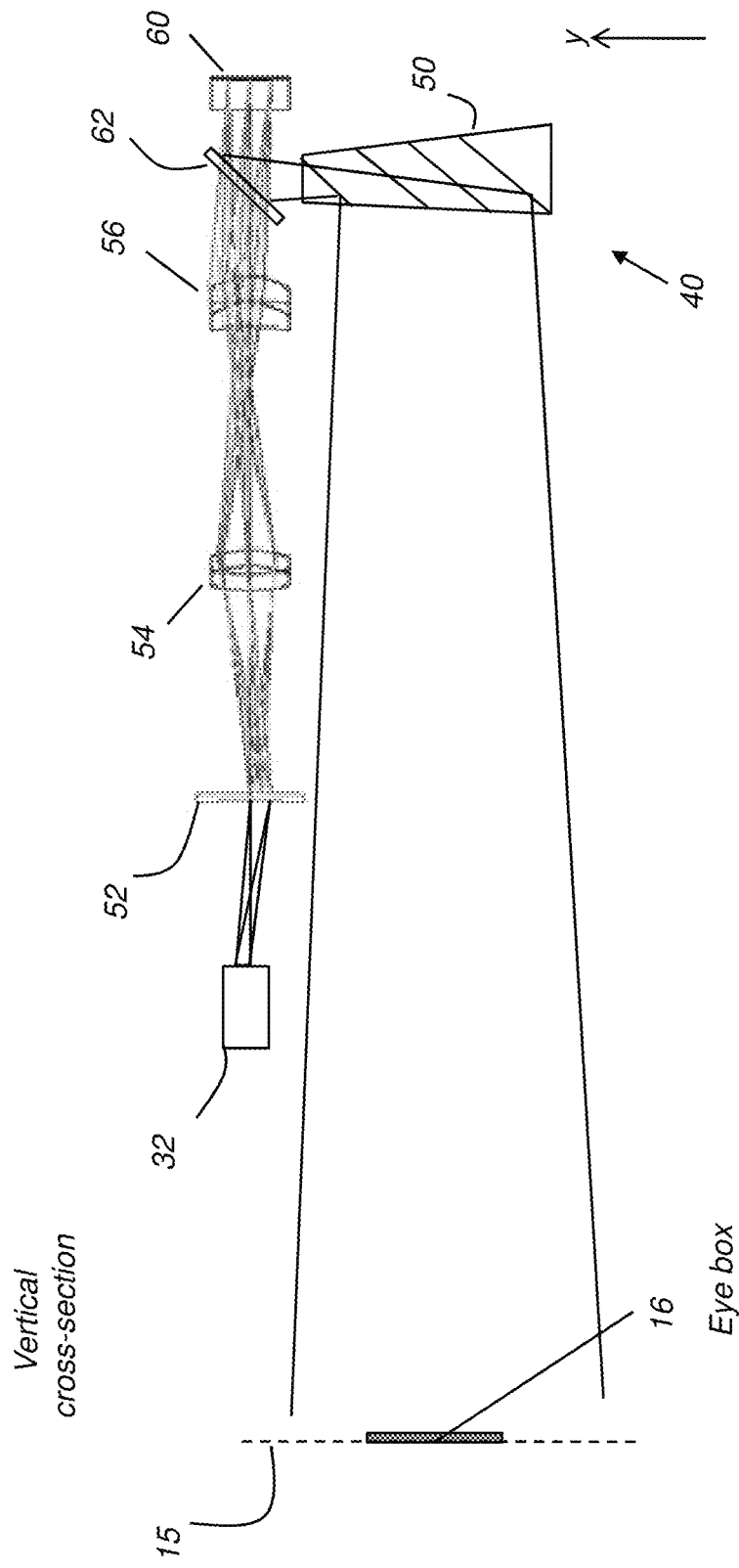
FIGS. 11A and 11B show cross sectional views of the monocentric embodiment of the present invention.
Figure 11B:
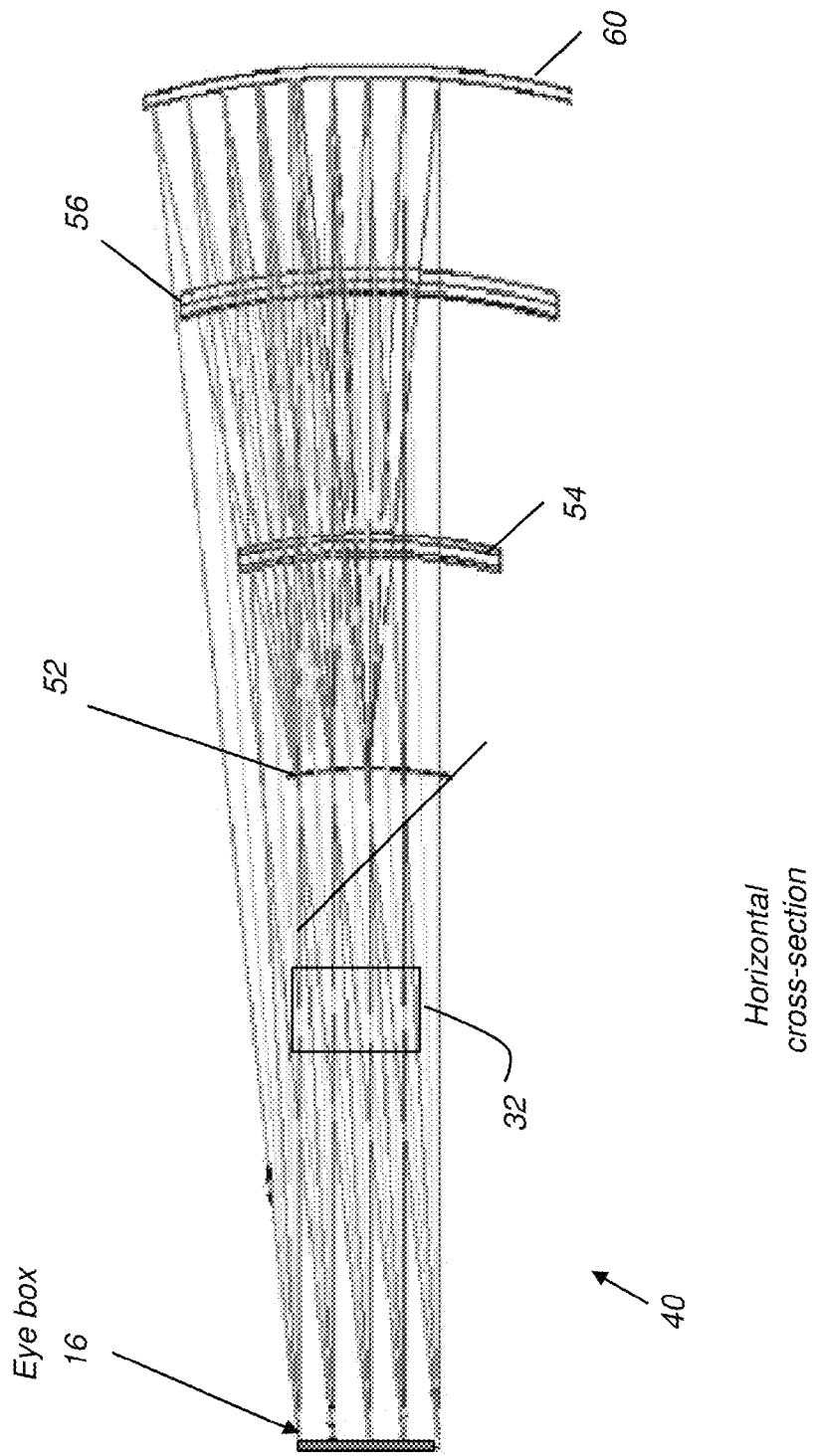

FIGS. 11A and 11B show vertical and horizontal cross-section views, respectively, of a volumetric imaging apparatus 40 according to an alternate embodiment of the present invention. Volumetric imaging apparatus 40 uses a monocentric optical arrangement. Component distances are exaggerated for clarity. Here, diffusion screen 52 is curved and lenses 54 and 56 are toroidal lenses. Screen 52, lenses 54 and 56, and a spherical minor 60 are monocentric with respect to a vertical line, a monocentric axis 15, through the center of the eye box 16. Toroidal lenses 54 and 56 do not have power in the horizontal plane as they are concentric with the eye box as shown in FIG. 11B. Thus, the only element active in the horizontal direction is spherical mirror 60.

Monocentric design helps to reduce image aberrations. In general, monocentric systems have the same performance in all fields of view, allowing expansion to larger fields when compared against non-monocentric systems.

The light from the laser image generator, volumetric image generator 32, forms a real image on diffusion screen 52. Toroidal lenses 54 and 56 condition the light beam in the vertical direction, with different magnification in the horizontal direction. The conditioned imaged light goes to a beam splitter 62 and to a spherical minor 60. Spherical minor 60 redirects this incident light toward pupil expander 50, which provides expansion of the vertical or Y axis without appreciable magnification of the horizontal X axis. As was shown earlier with reference to FIG. 6, the vertical axis of the imaged beam is reflected from combiner 24 to provide pupil expansion with respect to the vertical Y axis. Horizontal pupil expansion is not desirable for this type of system, as noted earlier.

Figure 12:
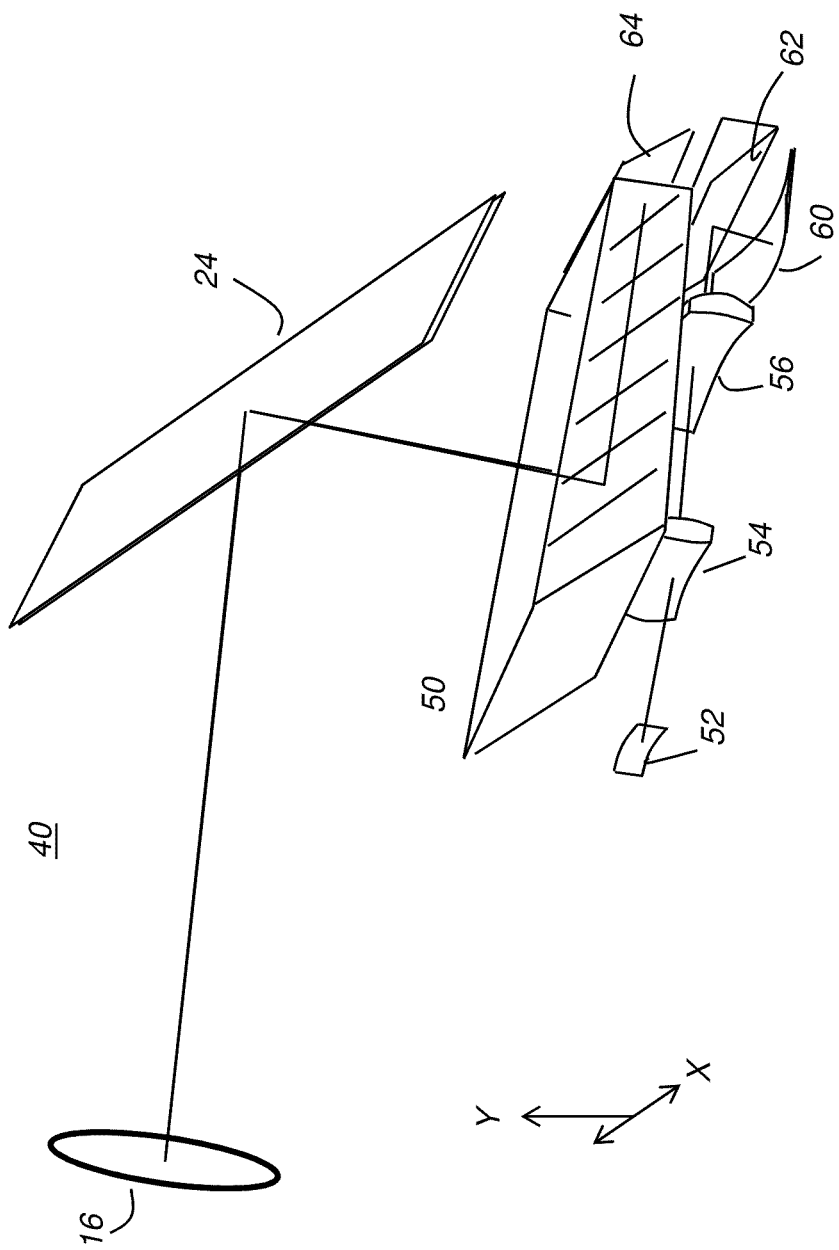
FIG. 12 is a perspective view of a volumetric display using a monocentric arrangement of optical components.
Figure 13:
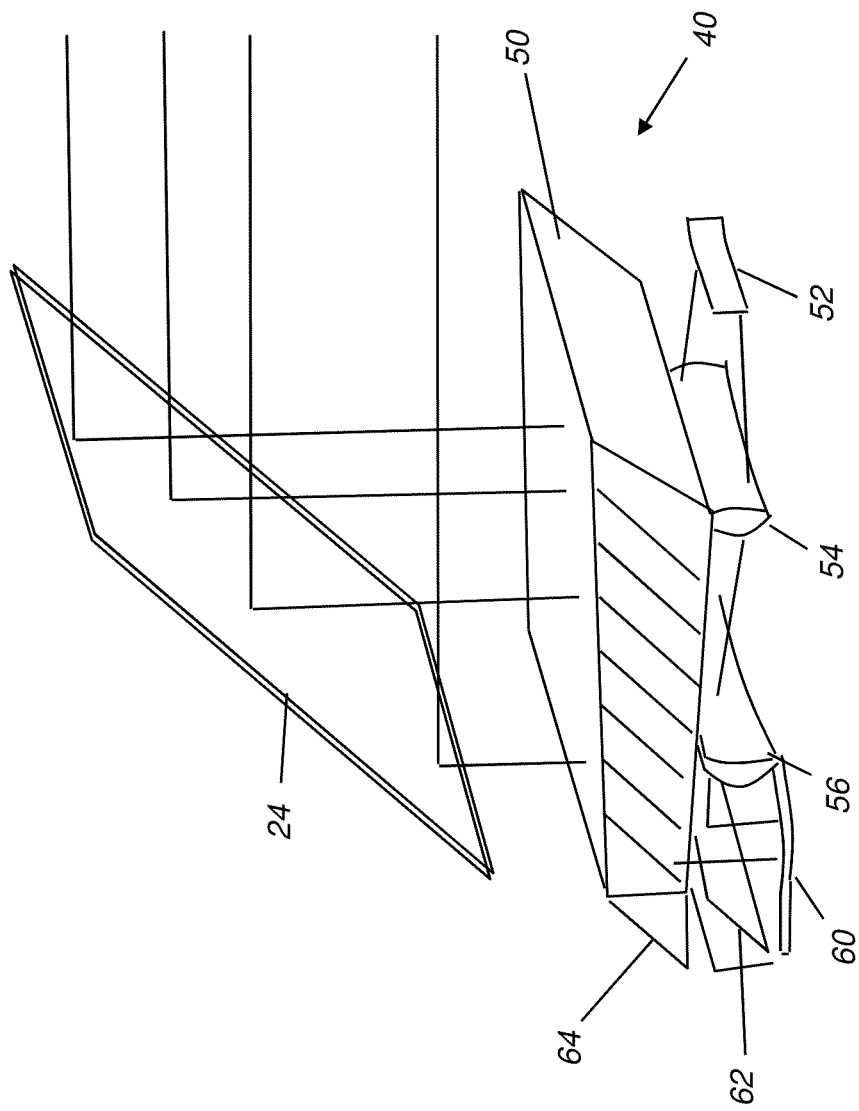
FIG. 13 shows a monocentric embodiment of the present invention showing pupil expander function.

The monocentric embodiment shown in FIGS. 12 and 13 allows a more compact arrangement of components, including an additional minor 64. This embodiment provides a horizontal field of view of approximately 16 degrees and a vertical field of view of about 12 degrees. Eye box 16, formed about 900 mm from the optical system for 3-D perception, is approximately 120 mm horizontally and about 100 mm vertically. Angular resolution in the horizontal direction, with an RMS spot of 45 microns and focal length of 450 mm is 0.1 mr (milliradian) or 0.3' of an arc. Angular resolution in the vertical direction, with an RMS spot of 25 microns and focal length of 138 mm is 0.2 mr. FIG. 13 shows the function of the pupil expander 50.

Figure 14:
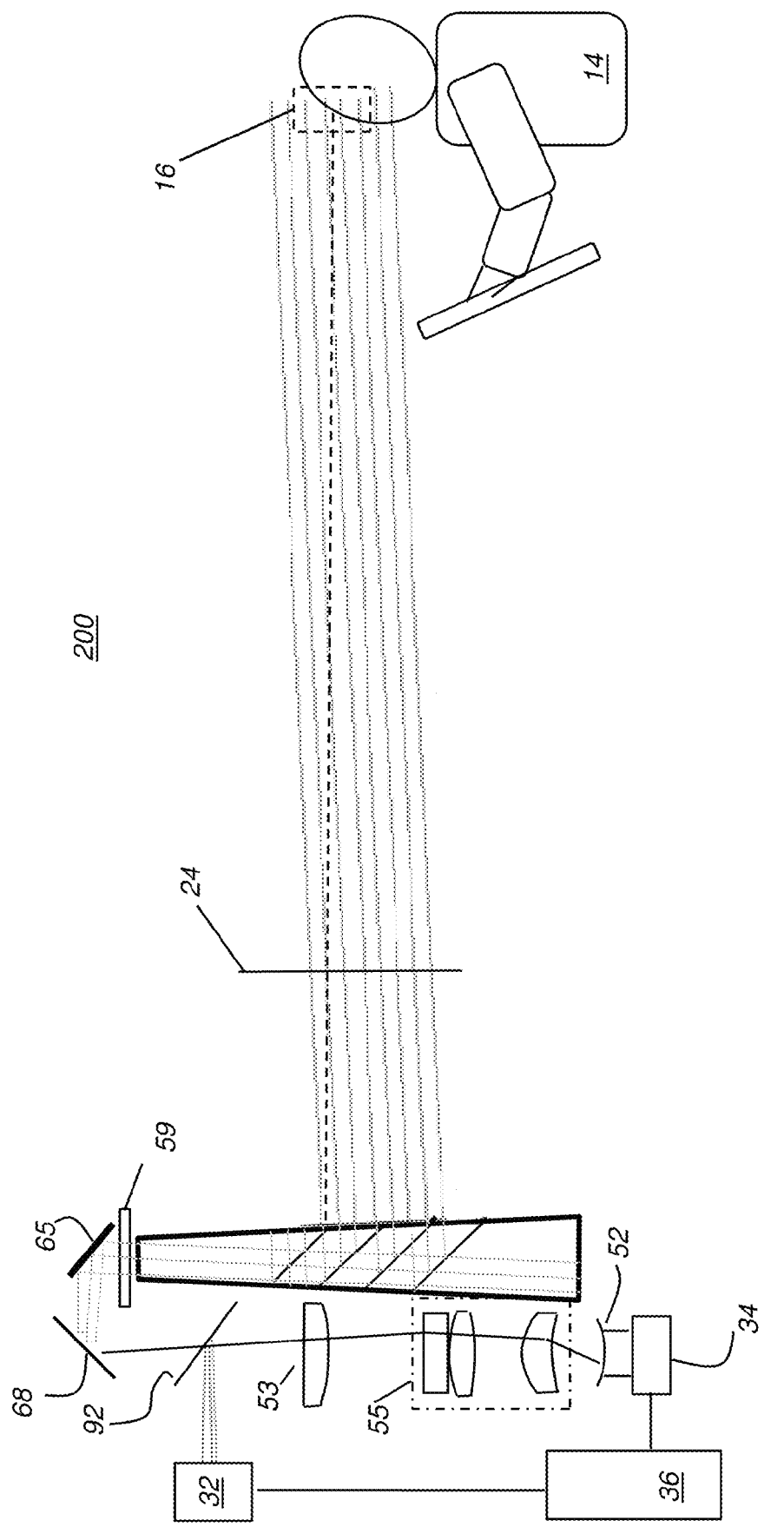
FIG. 14 is a block diagram that shows an alternate embodiment of a volumetric imaging apparatus using an aspheric Fresnel lens.

The block diagram of FIG. 14 shows an alternate embodiment of a volumetric imaging apparatus 200 using a mirror 65 with an aspheric Fresnel lens 59 instead of a curved mirror. This allows the elimination of one beam splitter, thus improving light efficiency and reducing system size and expense, using a low-cost Fresnel lens. Fresnel lens 59, shown as a singlet in FIG. 14, can alternately be a compound lens using a number of Fresnel components. Fresnel lens 59 in FIG. 14 has a rectangular aperture, with its horizontal dimension considerably larger than its vertical dimension, similar to the aperture of curved minor 102 in the embodiment shown in FIG. 8A.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. While the system is well suited for applications in navigational guidance, it also has applications also in the field of "augmented imaging" in which useful information is displayed in combination with visual scenery.

Thus, what is provided is an apparatus and method for volumetric imaging using a one-dimensional pupil expander.

PARTS LIST

| | |
|---|---|
| 10. | Volumetric display |
| 12. | Display device |
| 14. | Viewer |
| 15 | Monocentric axis |
| 16. | Eye box |
| 18. | Windshield |
| 20. | Eye lens |
| 22. | Exit pupil |
| 24. | Combiner |
| 26. | Relay lens |
| 28. | Diffusion screen |
| 30. | Light source |
| 32. | Volumetric image generator |
| 34. | Projection screen actuator |
| 36. | Computer |
| 40. | Volumetric imaging apparatus |
| 44. | Mirror |
| 50. | Pupil expander |
| 52. | Diffusion screen |
| 53 | Field lens |
| 54. | Toroidal lens |
| 55. | Relay optics |
| 56. | Toroidal lens |
| 58. | Mirror |
| 59. | Fresnel lens |
| 60. | Spherical minor |
| 62. | Beam splitter |
| 64. | Mirror |
| 65. | Mirror |
| 66. | Entrance pupil |
| 68. | Mirror |
| 70. | Entrance surface |
| 72. | Partially reflective surface |
| 74, 78. | Major surface |
| 76. | Substrate |
| 80. | Volumetric imaging apparatus |
| 82. | Beam splitter |
| 86, 88, 90. | Lens |
| 92. | Beam splitter |
| 94, 96. | Lens |
| 98. | Waveplate |
| 100. | Volumetric imaging apparatus |
| 102. | Curved mirror |
| 200. | Volumetric imaging apparatus |
| B1. | Input beam |
| B2. | Output beam |
| I. | Intermediate image |
| R1, R2, R3. | Light ray |
| R1', R2', R3'. | Virtual ray |
| S1, S2, S3, S4, S5, S6, S7, S8, S9, S10, S11, S12. | Surface |
| VC. | Virtual cable |

The invention claimed is:

1. A volumetric imaging apparatus comprising:
a volumetric image generator comprising a light source, a light modulator, and a display surface, wherein the volumetric image generator is energizable to form, over a range of focal positions, an image on the display surface at the entrance pupil of an optical system;
the optical system disposed to direct light from the display surface to a one-dimensional pupil expander; and
a combiner surface that is disposed in the path of output light from the pupil expander for displaying the volumetric image.

2. The apparatus of claim 1 wherein the volumetric image generator further comprises an actuator that is energizable to move the display surface within the range of focal positions.

3. The apparatus of claim 1 wherein the optical system further comprises a beam splitter and a curved minor in the path of imaged light directed to the one-dimensional pupil expander.

4. The apparatus of claim 3 wherein the beam splitter is a polarization beam splitter and further comprising a quarter wave plate disposed in the path of imaged light between the beam splitter and the curved minor.

5. The apparatus of claim 1 wherein the optical system is substantially monocentric.

6. The apparatus of claim 1 wherein the one-dimensional pupil expander has major surfaces that are oblique relative to each other.

7. The apparatus of claim 1 wherein the one-dimensional pupil expander comprises a plurality of partially reflective surfaces.

8. The apparatus of claim 1 wherein the one-dimensional pupil expander comprises a plurality of holographic surfaces.

9. The apparatus of claim 1 wherein the light source is a laser.

10. The apparatus of claim 1 wherein the light source is a polarized laser, the display surface is a polarization-preserving diffusion screen, and further comprising a polarization beam splitter.

11. The apparatus of claim 1 wherein the combiner surface comprises a vehicle windshield.

12. The apparatus of claim 1 further comprising one or more Fresnel lenses disposed to direct imaged light toward the one-dimensional pupil expander.

13. A volumetric imaging apparatus comprising:
a volumetric image generator comprising a laser light source that is energizable to form an image on a diffusive display surface and an actuator that is energizable to repeatedly move the display surface back and forth within the range of focal positions at the entrance pupil of an optical system;
the optical system disposed to direct light from the moving display surface through a beam splitter, toward a curved mirror, and to a one-dimensional beam expander; and
a combiner surface disposed in the path of output light from the one-dimensional beam expander for displaying the volumetric image.

14. The volumetric imaging apparatus of claim 13 wherein the one-dimensional beam expander is a pupil expander that expands the pupil in the vertical direction.

15. The volumetric imaging apparatus of claim 13 wherein the actuator is a voice coil actuator.

16. The volumetric imaging apparatus of claim 13 wherein the beam splitter is a polarization beam splitter and further comprising a quarter wave plate disposed between the beam splitter and the curved mirror.

17. A method for forming a volumetric image, the method comprising:
energizing a light source and modulating the light to form an image onto a diffusive surface;
moving the diffusive surface back and forth over a range of focal positions at the entrance pupil of an optical system;
directing the light from the diffusive surface through a beam splitter and toward a one-dimensional pupil expander; and
disposing a combiner surface in the path of output light from the pupil expander for displaying the volumetric image.

18. The method of claim 17 wherein disposing the combiner surface comprises mounting a substantially flat, transparent surface onto a windshield.

19. The method of claim 17 wherein directing the light toward the one-dimensional pupil expander further comprises directing the light from the beam splitter toward a curved mirror.

20. The method of claim 17 wherein directing the light toward the one-dimensional pupil expander further comprises directing the light from the beam splitter toward a Fresnel lens.

* * * * *